(12) United States Patent
Stark et al.

(10) Patent No.: US 8,361,580 B2
(45) Date of Patent: Jan. 29, 2013

(54) UV LIGHT AND PROTECTIVE FILM

(75) Inventors: Kurt Stark, Neuhaus (DE); Hendrik Hummel, Forchheim (DE); Manfred Rübner, Forschheim (DE)

(73) Assignee: Huhtamaki Forschheim, Zweigniederlassung der Huhtamaki Deutschland GmbH & Co. KG, Forschheim (DE)

( * ) Notice: Subject to any disclaimer, the term of this patent is extended or adjusted under 35 U.S.C. 154(b) by 38 days.

(21) Appl. No.: 12/873,932

(22) Filed: Sep. 1, 2010

(65) Prior Publication Data

US 2011/0083765 A1 Apr. 14, 2011

Related U.S. Application Data

(63) Continuation of application No. PCT/EP2009/008845, filed on Dec. 10, 2009.

(51) Int. Cl.
*B29D 22/00* (2006.01)

(52) U.S. Cl. ...................................... 428/36.91; 138/97

(58) Field of Classification Search .................. 428/35.7, 428/36.9, 36.91; 138/97
See application file for complete search history.

(56) References Cited

U.S. PATENT DOCUMENTS

| | | | |
|---|---|---|---|
| 6,679,966 B1 * | 1/2004 | Brandenburger | 156/190 |
| 2003/0176551 A1 | 9/2003 | Rediske | |
| 2005/0005285 A1 * | 1/2005 | Olson et al. | 720/719 |
| 2010/0003432 A1 * | 1/2010 | Schiffman | 428/34.8 |
| 2011/0083765 A1 * | 4/2011 | Stark et al. | 138/97 |

FOREIGN PATENT DOCUMENTS

| | | |
|---|---|---|
| CH | 676029 A5 | 11/1990 |
| DE | 29700236 U1 | 5/1998 |
| EP | 1004626 A1 | 5/2000 |
| GB | 2332678 A | 6/1999 |
| JP | 55124485 A | 9/1980 |
| JP | 58076031 A | 5/1983 |
| WO | 2007/147758 A2 | 12/2007 |
| WO | 2009/105938 A1 | 9/2009 |

OTHER PUBLICATIONS

International Search Report Dated Mar. 22, 2010.
German Search Report for 102008062407.1, Date 2009.
German Search Report for 102009041841.5, Date 2010.

* cited by examiner

*Primary Examiner* — N. Edwards
(74) *Attorney, Agent, or Firm* — Norris McLaughlin & Marcus PA (57) ABSTRACT

A contact transparent single layer or multilayer film absorbing and/or reflecting UV radiation and short-wavelength visible light is disclosed. The film comprises at least one layer based on at least one optionally modified thermoplastic olefin homo- or co-polymer, comprising a combination of at least one organic or inorganic colored pigment or dye absorbing and/or reflecting short-wavelength visible light, and of at least one organic or inorganic compound absorbing and/or reflecting the UV radiation. The film disclosed herein can be used as a protective film against the effects of UV radiation and short-wavelength visible light, and a sewer cleaning system comprising said multilayer film as an external hose film and an inner, multilayer plastic film, and an impregnated UV-curable carrier material present between the two hose films.

3 Claims, 1 Drawing Sheet

UV LIGHT AND PROTECTIVE FILM

This application is a Continuation of 371 application of PCT/EP2009/008845 filed Dec. 10, 2009, which claims priority to the German application 10 2008 062 407.1 filed Dec. 17, 2008 and German application 10 2009 041 841.5 filed Sep. 18, 2009.

The present invention relates to an at least contact transparent, single layer or multilayer film absorbing and/or reflecting UV radiation and short-wavelength visible light, comprising at least one layer based on at least one optionally modified thermoplastic olefin homo- or copolymer, comprising a combination of at least one organic or inorganic colored pigment or dye absorbing and/or reflecting short-wavelength visible light, and of at least one organic or inorganic compound absorbing and/or reflecting the UV radiation, and to the use of this film as a protective film against the effect of UV radiation and short-wavelength visible light, preferably in sewer restoration systems, and to a corresponding sewer restoration system.

Protective films which, although they have a protective effect against UV radiation, are nevertheless opaque, are known from the prior art.

For many reasons, however, it is advantageous for such protective films to be transparent. In the case of food packaging, for example, it is desirable that the packaged materials to be protected against the effect of UV radiation can be observed externally by the purchaser. EP 1 138 479 B1 describes such a protective film, which protects against the effect of UV radiation up to a wavelength of <350 nm by containing titanium dioxide as a pigment absorbing UV radiation. The titanium dioxide must be provided in a particular finely disperse form, in order to ensure sufficient transparency of the protective film.

DE 1 002 177 A1 describes a thermoformable transparent film of a thermoplastic, in which the UV radiation is fully absorbed up to a wavelength <380 nm with the aid of organic or metalorganic compounds.

WO 00/27914 describes a transparent single layer or multilayer film which has a protective effect against UV radiation in a wavelength range of 280-390 nm, by its having a UV radiation absorbing combination of an inorganic compound and an organic compound, for example a compound of zinc oxide or titanium dioxide and a benzotriazole.

Protective films, which have a protective effect against UV radiation, are used inter alia for the restoration of sewers and sewer pipelines by the so-called tube lining method. According to this method, a flexible tube is first provided and is inserted into the pipe to be restorated. This tube comprises two tubular films with different diameters between which a carrier material, preferably glass fiber material, which is impregnated with a reactive synthetic resin, is placed. After the tube has been introduced into the sewer pipe and the tube has been expanded by blowing in the sewer pipe, the synthetic resin between the two tubular films needs to be cured in order to provide a stable tube on the sewer pipe's inner wall to be restorated. The curing may be carried out by exposure to UV radiation, in which case photoinitiators in the synthetic resin initiate the polymerization or curing process under the effect of UV radiation. In order to prevent undesired premature curing of the synthetic resin before insertion into the sewer pipe to be restorated, the external tubular film of the tube must comprise or consist of a protective layer which prevents premature action of UV radiation and therefore premature resin curing. The internal tubular film of such a restoration tube, on the other hand, must transmit UV radiation in order to permit the curing process after expansion by blowing. Tubes made of conventional multilayer tubular films, which are used in sewer restoration according to the tube lining technique, usually present sufficient absorption of UV radiation. Yet since the photoinitiators contained in the reactive synthetic resins can even be activated under the effect of longer-wavelength radiation, for example short-wavelength visible light, it is also necessary to avoid this risk of premature curing, in particular during storage. Inter alia, this is attempted by the use of opaque tubular films.

Owing to this, however, it is not possible to verify uniform impregnation of the carrier material with the synthetic resin to be cured, and therefore prevent defects in the restored sewer pipe due to nonuniform impregnation.

There is therefore a need for protective films which have at least contact transparency, that is to say are not opaque, but nevertheless avoid the effect of both UV radiation and short-wavelength visible light.

It was therefore an object of the present invention to provide a protective film which is at least contact transparent but nevertheless prevents the effect of UV radiation and short-wavelength visible light.

This object is achieved by providing the at least contact transparent single layer or multilayer film absorbing and/or reflecting UV radiation and short-wavelength visible light according to the invention, comprising at least one layer based on at least one optionally modified thermoplastic olefin homo- or copolymer, comprising a combination of at least one organic or inorganic colored pigment or dye absorbing and/or reflecting short-wavelength visible light, and of at least one organic or inorganic compound absorbing and/or reflecting the UV radiation.

The term "contact transparent" in the context of this invention is intended to mean that the film according to the invention is transparent enough to allow verification of uniform impregnation of the carrier material with the synthetic resin to be cured. This is based on checking the brightness of the impregnated carrier material. The contact transparency is determined by the method described below in the examples.

The term "UV radiation" in the context of this invention is intended to mean electromagnetic radiation in a wavelength range of from 200 to 400 nm.

The term "short-wavelength visible light" in the context of this invention is intended to mean electromagnetic radiation in a wavelength range of from 400 to 500 nm, preferably from 400 to 450 nm.

The film according to the invention preferably contains at least one organic or inorganic colored pigment or at least one organic or inorganic dye selected from the group comprising carbonyl dyes, preferably quinone dyes, indigo dyes and quinacridones, azo compounds, cyanine compounds, preferably triphenylmethane compounds, azomethines, isoindolines, dioxazines, metal oxides, transition metal oxides, metal oxide hydrates and transition metal oxide hydrates. From these dye groups or colored pigments, the yellow dye groups or colored pigments are particularly preferably selected.

It is preferable to provide a yellow organic colored pigment or a yellow organic dye selected from the group comprising benzimidazole derivatives, benzotriazole derivatives, 1,4-quinone derivatives, 1,4-naphthoquinone derivatives, 9,10-anthraquinone derivatives, phenylazophenol derivatives, respectively in the form of the free compounds, in the form of tautomers or the salts of acids or bases or the solvates, preferably the hydrates. A yellow inorganic colored pigment or a yellow inorganic dye is preferably provided, selected from the group comprising transition metal oxides and transition metal oxide hydrates. A yellow colored pigment or a yellow dye selected from the group comprising 4-phenylazophenol, 2-(2'-methyl)phenylazo-4-methylphenol, n-(4-phenylazo) phenyldiethanolamine, benzotriazoles, benzimidazolone, iron oxide and iron oxide hydrate is particularly preferred, benzimidazolone being more particularly preferred.

The organic or inorganic colored pigment or the organic or inorganic dye preferably absorbs and/or reflects short-wavelength visible light in the wavelength range of from 400 to 500 nm, particularly preferably in the wavelength range of from 400 to 450 nm, in each case preferably by more than 90%.

In a preferred embodiment, the film according to the invention contains at least one organic or inorganic compound selected from the group comprising metal oxides, transition metal oxides, metal oxide hydrates, transition metal oxide hydrates, phosphites, benzophenones, anthranilates, salicylates, dibenzoylmethane derivatives, p-aminobenzoic acid derivatives, cinnamic acid derivatives (phenylacrylic acid derivatives), benzimidazole derivatives, benzotriazole derivatives, cyanoacrylates, β-β'-divinylacrylates, alkyl-α-cyano-β-β'-divinylacrylates, 1,3,5-triazine compounds and sterically hindered amines, respectively in the form of the free compounds, in the form of their tautomers or respectively their salts of acids or bases as a compound absorbing and/or reflecting UV radiation. Some of such compounds are commercially available products, for example Uvinuls® from BASF AG.

The term "sterically hindered amines" is intended to mean compounds in which one or more space-filling organic radical is bonded to at least one trivalent nitrogen atom.

They are preferably aromatic or aliphatic, acyclic or cyclic, secondary and tertiary amines such as N,N'-disubstituted p-phenylenediamines or substituted (amino)-piperidines.

As the organic or inorganic compound absorbing and/or reflecting UV radiation, it is preferable to provide at least one compound selected from the group comprising metal and transition metal oxides and compounds of the following general structural formulae a to u:

a b c d e f g h i j k l m n

5
-continued

6
-continued

R¹ in these respectively stands for one or more, for example two, three or four radicals respectively selected independently of one another from the group comprising hydrogen; OH; halogen; NH₂; CN; C(=O)H; C(=O)OH; SO₃H; O—$C_{1-10}$ alkyl, NH($C_{1-10}$ alkyl), N($C_{1-10}$ alkyl)₂, $C_{1-10}$ alkyl, —$C_{1-10}$ alkyl-O—$C_{1-10}$ alkyl-, respectively branched or unbranched, saturated or unsaturated, unsubstituted or substituted one or more times with OH, halogen, =O, C(=O)H, C(=O)OH, phenyl, NH₂, C(=O)—$C_{1-10}$ alkyl, C(=O)—O—$C_{1-10}$ alkyl, O—$C_{1-10}$ alkyl, O—C(=O)—$C_{1-10}$ alkyl, respectively branched or unbranched, saturated or unsaturated; phenyl, menthyl, homomenthyl, benzyl, cyclohexyl, respectively unsubstituted or substituted one or more times with OH, halogen, C(=O)H, C(=O)OH, NH₂, C(=O)—$C_{1-10}$ alkyl, C(=O)—O—$C_{1-10}$ alkyl, O—$C_{1-10}$ alkyl, O—C(=O)—$C_{1-10}$ alkyl;

R² respectively stands for one or more, for example two, three or four radicals respectively selected independently of one another from the group comprising hydrogen, $C_{1-8}$ alkyl, respectively branched or unbranched, saturated or unsaturated, unsubstituted or substituted one or more times with OH, halogen, =O, NH₂, C(=O)H; C(=O)OH; CN; C(=O)—$C_{1-10}$ alkyl, C(=O)—O—$C_{1-10}$ alkyl, O—$C_{1-10}$ alkyl, O—C(=O)—$C_{1-10}$ alkyl, respectively branched or unbranched, saturated or unsaturated; phenyl, menthyl, homomenthyl, benzyl, cyclohexyl, respectively unsubstituted or substituted one or more times with OH, halogen, C(=O)H; C(=O)OH; NH₂, C(=O)—$C_{1-10}$ alkyl, C(=O)—O—$C_{1-10}$ alkyl, O—$C_{1-10}$ alkyl, O—C(=O)—$C_{1-10}$ alkyl;

R³ respectively stands for one or more, for example two, three, four, five or six radicals respectively selected independently of one another from the group comprising hydrogen; OH; NH₂; CN; C(=O)H; C(=O)OH; =O; SO₃H; O—$C_{1-10}$ alkyl, NH($C_{1-10}$ alkyl), N($C_{1-10}$ alkyl)₂, $C_{1-10}$ alkyl, —$C_{1-10}$ alkyl-O—$C_{1-10}$ alkyl-, respectively branched or unbranched, saturated or unsaturated, unsubstituted or substituted one or more times with OH, halogen, =O, epoxy, NH₂, phenyl, C(=O)—$C_{1-8}$ alkyl, C(=O)—O—$C_{1-10}$ alkyl, O—$C_{1-10}$ alkyl, O—C(=O)—$C_{1-10}$ alkyl, respectively branched or unbranched, saturated or unsaturated; phenyl, menthyl, homomenthyl, benzyl, cyclohexyl, respectively unsubstituted or substituted one or more times with OH, halogen, C(=O)H; C(=O)OH; NH$_2$, C(=O)—C$_{1-10}$ alkyl, C(=O)—O—C$_{1-10}$ alkyl, O—C$_{1-10}$ alkyl, O—C(=O)—C$_{1-10}$ alkyl;

X stands for C$_{1-20}$ alkyl, branched or unbranched, saturated or unsaturated, unsubstituted or substituted one or more times with substituents selected independently of one another from the group comprising H; Halogen; OH; =O; epoxy; NH$_2$; C(=O)H; C(=O)OH; CN; C(=O)—C$_{1-10}$ alkyl, C(=O)—O—C$_{1-10}$ alkyl, O—C$_{1-10}$ alkyl, O—C(=O)—C$_{1-10}$ alkyl, respectively branched or unbranched, saturated or unsaturated, in which case one or more, for example one, two or three C atoms of the C$_{1-20}$ alkyl may optionally be replaced by one or more, for example one, two or three heteroatoms selected independently of one another from the group comprising N, O, S, NH and N(C$_{1-8}$ alkyl);

n stands for 0 to 200, preferably from 0 to 100, particularly preferably for 0 to 20, more particularly preferably for 0 to 10;

The expressions "C$_{1-10}$ alkyl" and "C$_{1-20}$ alkyl" in the context of this invention cover acyclic, saturated or unsaturated hydrocarbon radicals which may be branched or unbranched and unsubstituted or substituted one or more times with from 1 to 8 or 1 to 20 C atoms, i.e. C$_{1-10}$-alkanyls, C$_{2-10}$-alkenyls and C$_{2-10}$-alkynyls or C$_{1-20}$-alkanyls, C$_{2-20}$-alkenyls and C$_{2-20}$-alkynyls. Here, alkenyls have at least one C—C double bond and alkynyls have at least one C—C triple bond.

The alkyl is preferably selected from the group comprising methyl, ethyl, n-propyl, 2-propyl, n-butyl, isobutyl, sec.-butyl, tert.-butyl, n-pentyl, isopentyl, neopentyl, n-hexyl, n-heptyl, n-octyl, n-nonyl, n-decyl, ethylenyl(vinyl), ethinyl, propenyl(—CH$_2$CH=CH$_2$, —CH=CH—CH$_3$, —C(=CH$_2$)—CH$_3$), propinyl(—CH—C≡CH, —C≡C—CH$_3$), butenyl, butinyl, pentenyl, pentinyl, hexenyl and hexinyl, heptenyl, heptinyl, octenyl and octinyl.

As the organic or inorganic compounds absorbing and/or reflecting UV radiation, it is particularly preferable to use at least one compound from the group comprising zinc oxide, titanium dioxide, 2-ethoxyethyl p-methoxycinnamate, diethanolamine p-methoxycinnamate, octyl p-methoxycinnamate, 2-ethylhexyl 2-cyano-3,3-diphenylacrylate, potassium cinnamate, propyl 4-methoxycinnamate, amyl 4-methoxycinnamate, α-cyano-4-methoxycinnamic acid or the corresponding hexyl ester, cyclohexyl 4-methoxycinnamate, glyceryl p-aminobenzoate, amyl p-dimethylaminobenzoate, ethyl 4-bis(hydroxypropyl)aminobenzoate, octyl p-dimethylaminobenzoate, ethoxylated 4-aminobenzoic acid, octyl salicylate, triethanolamine salicylate, salts of salicylic acid, 4-isopropylbenzyl salicylate, 2-ethylhexyl 2-(4-phenylbenzoyl)benzoate, homomenthyl salicylate, 2-hydroxy-4-methoxybenzophenone, 2,4,6-trianilino-(p-carbo-2-ethylhexyloxy)-1,3,5-triazine, 2-phenylbenzimidazole-5-sulfonic acid, 1-(4-tert-butylphenyl)-3-(4-methoxyphenyl)propane-1,3-dione, p-cumenyl-3-phenylpropane-1,3-dione, 1,3-bis(4-methoxyphenyl)propane-1,3-dione, menthylanthranilate, homomenthyl N-acetylanthranilate, 2-hydroxy-4-octylbenzophenone (Uvinul® 3008, Uvinul® 3008 FL), 6-tert-butyl-2-(5-chloro-2H-benzotriazol-2-yl)-4-methylphenol (Uvinul® 3026, Uvinul® 3026 GR), 2,4-di-tert-butyl-6-(5-chloro-2H-benzotriazol-2-yl)phenol (Uvinul® 3027), 2-(2H-benzotriazol-2-yl)-4,6-di-tert-pentylphenol (Uvinul® 3028, Uvinul® 3028 GR), 2-(2H-benzotriazol-2-yl)-4-(1,1,3,3-tetramethylbutyl)phenol (Uvinul® 3029, Uvinul® 3029 GR), 1,3-bis[(2'-cyano-3',3'-diphenylacryloyl)oxy]-2,2-bis{[(2'-cyano-3',3'-diphenylacryloyl)oxy]methyl}propane (Uvinul® 3030, Uvinul® 3030 GR), 2-(2H-benzotriazol-2-yl)-4-methylphenol (Uvinul® 3033 P), 2-(2H-benzotriazol-2-yl)-4,6-bis(1-methyl-1-phenylethyl) phenol (Uvinul® 3034), ethyl 2-cyano-3,3-diphenylacrylate (Uvinul® 3035), (2-ethylhexyl) 2-cyano-3,3-diphenylacrylate (Uvinul® 3039), N,N'-bisformyl-N,N'-bis(2,2,6,6-tetramethyl-4-piperidinyl)-hexamethylenediamine (Uvinul® 4050 H), bis(2,2,6,6-tetramethyl-4-piperidyl)sebacate (Uvinul® 4077 H, Uvinul® 4077 GR), bis(1,2,2,6,6-pentamethyl-4-piperidyl)sebacate, methyl-(1,2,2,6,6-pentamethyl-4-piperidyl)sebacate (Uvinule® 4092 H), (Uvinul® 5050 H)

(Uvinul® 5062 H), (Uvinul® 5062 GR)

The organic or inorganic compound preferably absorbs and/or reflects UV radiation in a wavelength range of from 200 to 400 nm, particularly preferably 300 to 400 nm, in each case preferably by more than 90%.

The film according to the invention preferably contains from 0.05 to 20 wt %, particularly preferably from 0.1 to 5 wt %, more particularly preferably from 0.1 to 2 wt %, respectively expressed in terms of the total weight of the film, of the combination of at least one organic or inorganic colored pigment or dye and at least one organic or inorganic compound.

The film according to the invention preferably contains from 0.05 to 10 wt %, particularly preferably from 0.1 to 3 wt %, expressed in terms of the total weight of the film, of the organic or inorganic colored pigment or dye.

The film according to the invention preferably contains from 0.05 to 10 wt %, particularly preferably from 0.1 to 2 wt %, expressed in terms of the total weight of the film, of the organic or inorganic compound.

Each component of the combination is preferably stable at temperatures of up to 300° C.

The film according to the invention is single-layered or multilayered, preferably multilayered. The film according to the invention is preferably not shrinkable.

The film according to the invention preferably comprises at least one barrier layer, particularly preferably an oxygen barrier layer, water vapor barrier layer or an oil barrier layer.

At least one polyamide (PA), ethylene-vinyl alcohol copolymer (EVOH), polyvinyl alcohol (PVOH), cyclic olefin copolymer (COC), polyvinylidene chloride (PVdC) or a mixture of at least two of said polymers, particularly preferably at least one polyamide, is preferably suitable for producing the barrier layer.

The polyamides (PA) used to produce the barrier layer are preferably thermoplastic aliphatic, semiaromatic or aromatic polyamides. Correspondingly, the diamines used to produce these polyamides may be either aliphatic diamines having 2-10 carbon atoms, for example hexamethylenediamine, or aromatic diamines having 6-10 carbon atoms, for example p-phenylendiamine, and the dicarboxylic acids used to produce these polyamides may be aliphatic or aromatic dicarboxylic acids having 6-14 carbon atoms, for example adipic acid, terephthalic acid or isoterephthalic acid. The polyamides may furthermore be prepared from lactams having 4-10 carbon atoms, for example ε-caprolactam. Polyamides used according to the invention are for example PA 6, PA 12, PA 66, PA 6I, PA 6T and/or mixtures of at least two of said polymers.

The polyvinyl alcohols used to produce the barrier layer are obtained by complete or partial hydrolysis of corresponding polyvinyl acetates (PVA) and therefore comprise both partially saponified polyvinyl acetates, which have a saponification degree of from 50 to 98 mol %, and fully saponified polyvinyl acetates having a saponification degree $\geq 98\%$.

The ethylene-vinyl alcohol copolymers (EVOH) used to produce the barrier layer are obtained by complete or partial hydrolysis of corresponding polyvinyl acetates containing ethylene (EVAc) and comprise above all fully saponified polyvinyl acetates containing ethylene, having a saponification degree $\geq 98\%$.

The cyclic olefin copolymers (COC) used to produce the barrier layer may also be copolymers of $\alpha,\beta$-unsaturated cyclic olefins having 4-10 carbon atoms, for example norbornene, and thermoplastic $\alpha,\beta$-unsaturated olefins such as ethylene or propylene.

At least one surface layer of the film according to the invention is preferably based on at least one thermoplastic olefin homo- or copolymer, which is preferably sealable.

Olefin homo- or copolymers in the context of this invention are thermoplastic polymers of $\alpha,\beta$-unsaturated olefins having 2-6 carbon atoms, for example polyethylene (PE, in particular LDPE or HDPE), polypropylene (PP), polybutylene (PB), polyisobutylene (PI) or mixtures of at least two of said polymers. "LDPE" refers to low density polyethylene which has a density in the range of 0.86-0.93 g/cm$^3$ and is distinguished by a high degree of branching of the molecules. "HDPE" refers to a high density polyethylene which has only little branching of the molecule chain; the density may lie in the range of between 0.94 and 0.97 g/cm$^3$.

Said olefin homo- or copolymers may optionally be modified with at least one organic acid or at least one organic acid anhydride, preferably with a cyclic organic acid anhydride, particularly preferably with maleic anhydride, and thus be used as the material for an adhesion promoter layer in a multilayer film according to the invention.

Thus, in a preferred embodiment an adhesion promoter layer, preferably containing at least one modified polyolefin, may be arranged between a surface layer and the barrier layer.

Modified polyolefins are intended to mean a thermoplastic polymer of an $\alpha,\beta$-unsaturated olefin having 2-6 carbon atoms, for example polyethylene (PE, in particular LDPE or HDPE), polypropylene (PP), polybutylene (PB), polyisobutylene (PI) or mixtures of at least two of said polymers, which is or are modified with at least one organic acid or at least one organic acid anhydride. A polyethylene or polypropylene modified with a cyclic organic acid anhydride, particularly preferably a polyethylene or polypropylene modified with maleic anhydride, is preferred as a modified polyolefin.

The adhesion promoter layer preferably consists of a modified polyolefin, which is particularly preferably grafted with maleic anhydride.

In a preferred embodiment, each of the surface layers of the multilayer film according to the invention is based on at least one preferably sealable olefin homo- or copolymer, and is respectively bonded to the barrier layer via a, previously described, adhesion promoter layer.

In a preferred embodiment, at least one of the internal layers of a multilayer film according to the invention contains the combination absorbing and/or reflecting the harmful radiation, consisting of at least one organic or inorganic colored pigment or dye and at least one organic or inorganic compound.

The components of the combination are preferably provided in the same layer of a multilayer film according to the invention, particularly preferably in an adhesion promoter layer.

Preferably, each of the adhesion promoter layers of the multilayer film according to the invention may contain the combination absorbing and/or reflecting the harmful radiation, consisting of at least one organic or inorganic colored pigment or dye and at least one organic or inorganic compound.

In another preferred embodiment, the components of the combination are provided in different layers of a multilayer film according to the invention.

Preferably, the colored pigment or the dye is provided in at least one surface layer and the organic or inorganic compound is provided in at least one internal layer of the multilayer film according to the invention.

Each of the adhesion promoter layers of the multilayer film according to the invention may preferably contain at least one organic or inorganic compound.

In another preferred embodiment, each of the layers of a multilayer film according to the invention with the exception of the barrier layer may contain at least one organic or inorganic colored pigment or dye.

Preferably, the film according to the invention may be arranged symmetrically in relation to a central bonding layer, preferably an adhesive layer.

Preferably, the film according to the invention has a layer thickness of from 20 to 2000 μm, particularly preferably from 50 to 1500 μm, more particularly preferably from 100 to 1000 μm, and in particular from 150 to 500 μm.

The film according to the invention may be produced by any desired production method, for example by lamination, extrusion or preferably by coextrusion.

Some or even all layers of a multilayer film according to the invention may in this case be formed by extrusion, in particular by blown film extrusion and/or flat film extrusion, in particular blown film coextrusion and/or flat film coextrusion.

If some layers of a film according to the invention are produced separately by one of the above methods, then the adhesion promoter may be applied for example as a powder, in the form of a film, melt or as a liquid preparation, for example as a solution or dispersion, by conventional methods such as spraying or casting onto one of the layers of the film according to the invention, for example the barrier layer or one of the surface layers, and a further layer or further layers may be bonded thereto. As an alternative, the adhesion promoter may also be laminated by extrusion onto one of the layers, for example the barrier layer or one of the surface layers, and a further layer or further layers may be bonded thereto.

This production method and corresponding production parameters are widely known to the person skilled in the art.

The multilayer film according to the invention may preferably be produced by coextrusion, in which case a blown film coextrusion method is more particularly preferred.

The film according to the invention may preferably be embossed and/or stretched.

The film according to the invention may furthermore preferably be printed.

The film according to the invention, in particular the multilayer film according to the invention, is suitable for the production of protective films against the effect of UV radiation and short-wavelength visible light.

The present invention therefore also provides the use of the film according to the invention, in particular the multilayer film according to the invention, for the production of protective films against the effect of UV radiation and short-wavelength visible light.

The present invention also provides the use of a film according to the invention as a protective film in tubular form, in particular as the external protective film in tubular form of a tube comprising two films in tubular form, i.e. a double-walled tube, to avoid curing, initiated by UV radiation and/or short-wavelength light, of a carrier material packed between the two tubular films and impregnated with reactive synthetic resin.

Particularly preferred is the use of a film according to the invention as an externally lying protective film in tubular form of a double-walled film tube having a carrier material lying between the two film tubes and impregnated with reactive synthetic resin, for sewer pipe restoration according to the tube lining technique.

The use of a film according to the invention as the externally lying protective film in tubular form of the double-walled tube used for tube lining has the great advantage that, besides the effect of UV radiation, it also prevents the effect of short-wavelength visible light. In this way, the photoinitiators contained in the synthetic resins to be cured cannot be activated even under the effect of longer-wavelength radiation so that undesired premature curing is prevented and the tube can be stored in the long term, preferably for at least one year. Since the film according to the invention is furthermore contact transparent, the verification of uniform impregnation of the carrier material with the synthetic resin to be cured can be carried out straightforwardly, so that the occurrence of defects in the restorated sewer pipe is prevented.

If the protective film according to the invention furthermore comprises a barrier layer, its use as a protective film for sewer restoration by the tube lining technique furthermore provides a barrier effect against possible drying of the resin and entry of substances such as monomers into the sewer system and into the groundwater. The sealable surface of the protective film according to the invention can furthermore be bonded at least partially, preferably fully comprehensively, to the carrier material preferably by heat sealing, which increases the stability of the system.

Furthermore, the protective film according to the invention may also be used for roofing, as external cladding, for protective clothing, as external coverings of building parts, shields and display panels of any type, for spectacles or window panes, as packaging material.

BRIEF DESCRIPTION OF THE DRAWINGS

FIG. 2 is a cross-sectional view of an internal multilayer plastic tubular film The tube used for sewer restoration (10) according to the tube lining technique should advantageously comprise not only a protective film according to the invention as an externally lying protective film in order to protect the carrier material, which is used for the sewer restoration and is impregnated with a synthetic resin compound to be cured, but also a preferably transparent plastic film as an internally lying tubular film, which has the properties necessary for the sewer restoration.

To this end, the film must have not only sufficiently storage-stable mechanical properties so that it can withstand the stresses during handling of the sewer restoration tube, particularly during expansion by blowing in the sewer system, the preceding transport and the preceding storage, but also after curing of the plastic material in the carrier material to form the restoration pipe can be removed therefrom without ripping or tearing.

Furthermore, it is also necessary to ensure that when the tube employed for the sewer restoration is being used, the internally lying tubular film also offers a sufficient barrier against drying of the resin, i.e. against the loss of monomers or other impregnation material and transmits enough UV radiation for curing in the sewer pipe.

It was therefore another object of the present invention to provide a sewer pipe restoration system which does not only prevent the effect of UV rays and short-wavelength visible light before it is used, but also avoids the problems arising when handling it during and after the sewer pipe restoration.

Figure 1:
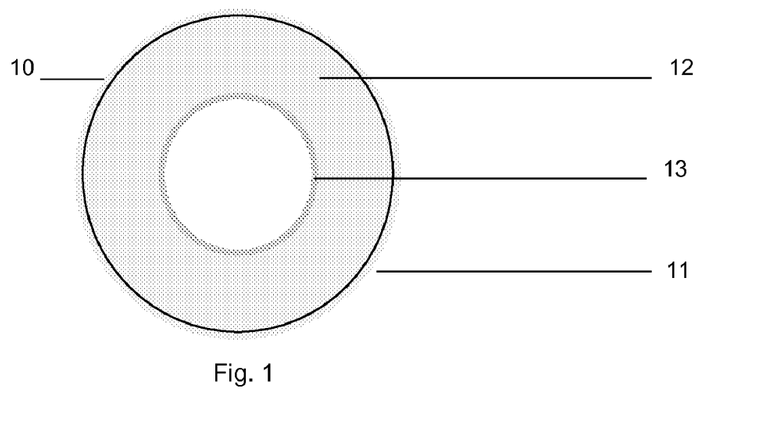
FIG. 1 is a cross-sectional view of a sewer pipe restoration system.

This is achieved by providing the sewer tube restoration system according to the invention. (10)

Figure 2:
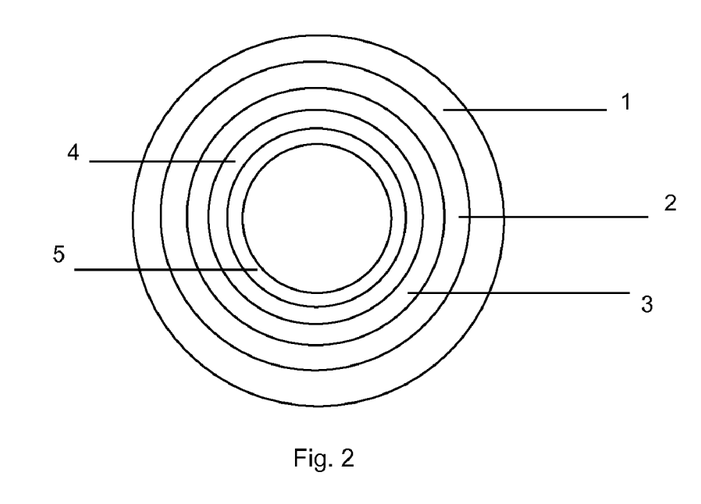

This sewer restoration system according to the invention is distinguished not only by a tube whose externally lying tubular film corresponds to the protective film according to the invention as described above, which is at least contact transparent and has properties absorbing and/or reflecting UV radiation and short-wavelength visible light, but also comprises an internally lying tubular film (13) which is transmissive, preferably transparent at least for UV rays and has the necessary property profile. The internally lying tubular film is preferably not shrinkable.

The tube preferably comprises an externally lying tubular film as a protective film (11) and an internally lying tubular film, and the carrier material lying between them (12) which is impregnated with the synthetic resin to be cured. After curing, the restorated sewer pipe is formed from this impregnated carrier material. Glass fabric consisting of glass fibers, fleeces and/or nonwoven textile fabrics, preferably impregnated with α,β-unsaturated polyester resins and unsaturated monomers, for example styrene, may preferably be envisaged as a carrier material.

After curing, the internally lying tubular film expanded by blowing is removed from the restorated sewer pipe formed by the plastic and the carrier material.

In order to satisfy the requirements of the problem-free handling of the internal tubular film during the sewer pipe restoration according to the tube lining technique, according to the invention an at least 3-layered plastic film is preferably used, which comprises a barrier layer, preferably an oxygen barrier layer, water vapor barrier layer and/or oil barrier layer, and the surface layer of which immediately next to the impregnated carrier material does not bond permanently, for example by tumescence and curing, to the liquid impregnation material to be cured, i.e. to the synthetic resin compound to be cured, but remains removable without tearing.

The barrier layer is preferably based on at least one of the polymers specified above for the production of the barrier layer of the externally lying protective film in tubular form of the sewer restoration system according to the invention, particularly preferably on at least one polyamide, ethylene/vinyl alcohol copolymer, polyvinyl alcohol, acyclic olefin copolymer, polyvinylidene chloride, more particularly preferably on at least one polyamide.

The barrier layer of the internally lying multilayer film in tubular form of the tube preferably carries a further plastic layer on each of its surfaces, of which the surface layer immediately next to the carrier material to be cured must not be affected by the impregnation liquid either in terms of its mechanical properties or in terms of its removability.

Olefin homo- and copolymers are preferably suitable for the production of these surface layers. Particularly suitable olefin homo- and copolymers are thermoplastic polymers of α,β-unsaturated olefins having from 2 to 8 carbon atoms, for example polyethylene, polypropylene, polybutylene, polyisobutylene or mixtures of at least two of said polymers. A polypropylene, preferably with a statistical structure, or a mixture of polyethylene and polypropylene, is more particularly preferred for the production of one or both surface layers. A mixture of polyethylenes, preferably of low density polyethylene and a low density linear polyethylene, may also preferably be used for the production of one or both surface layers. The barrier layer is preferably bonded to said surface layers via an adhesion promoter layer.

The polymer materials specified above for adhesion promoter layers may also be used for the production of the adhesion promoter layers between the barrier layer and the respective surface layer.

A 5-layered film having the following structure is more particularly preferably used as the internally lying tubular film for the sewer restoration system according to the invention:

Layer a) based on a mixture of polypropylene, preferably with a statistical structure, and polyethylene, which lies directly next to the carrier material to be cured (1)

Layer b) based on grafted polypropylene as an adhesion promoter layer (2)

Layer c) based on a thermoplastic polyamide as a barrier layer (3)

Layer d) based on grafted polypropylene as an adhesion promoter layer (4)

Layer e) based on polyethylene, preferably on a mixture of LDPE and LLDPE. (5)

Each of the layers of the internally lying film tube may also, if necessary, respectively independently of one another be provided with additives selected from the group comprising antioxidants, antiblocking agents, antifogging agents, antistatics, antimicrobial active agents, heat stabilizers, process stabilizers, process auxiliaries, flameproofing agents, nucleation agents, crystallization agents, preferably crystal nucleation agents, lubricants, flexibilizing agents, sealing agents, plasticizers, silanes, spacers, fillers, peel additives, waxes, wetting agents, surface-active compounds, preferably surfactants, and dispersants.

In the sewer restoration system according to the invention, the internally lying multilayer film in tubular form is preferably used so that the surface layer based on the mixture of polypropylene and polyethylene lies directly next to the carrier material to be cured.

The internally lying tubular film of the sewer restoration system according to the invention preferably has a total thickness of 20-2000 μm, preferably 120-300 μm, more particularly preferably 150-250 μm, and is distinguished by outstanding mechanical values.

By using the tube restoration system according to the invention, in particular owing to the internal tubular film as described above, the double-walled tube inserted into the sewer to be restorated can be expanded by blowing without problems, i.e. without bursting, in order to achieve problem-free UV curing of the carrier material contained in the tube and impregnated with the liquid impregnation material. After curing, when the solidified restorated sewer pipe consisting of the cured carrier material has been obtained, the internal tubular film can furthermore be removed from it without tearing or sticking.

EXAMPLES

The following examples serve to explain the invention, but are not to be interpreted as restrictive.

Chemical Characterization of the Raw Materials Used:
- Batch 1: Master batch (zinc oxide and sterically hindered amine (polypiperidine amino derivative) (60 wt %), LDPE (40 wt %))
- Batch 2: Master batch (yellow pigment: benzimidazolone (40 wt %), PE (60 wt %))
- Admer NF 498E: LDPE modified with maleic anhydride groups from Mitsui (adhesion promoter)
- Durethan C 38F: Copolyamide
- Admer Q B 520 E: Polypropylene grafted with maleic anhydride
- Dow R 338-02N: Statistically structured polypropylene from Dow The multilayer films of Comparative Examples 1 to 3 and Example 1 respectively consist of 5 layers, have a layer thickness of 200 μm each and are produced by blown film coextrusion. Layers 1-5 respectively adjoin one another directly in the following order. All subsequent % data represent wt %.

Comparative Example 1

Colorless Transparent Film

Layer 1 (65 μm): 100% LDPE
Layer 2 (20 μm): 100% Admer NF 498E
Layer 3 (30 μm): 100% PA
Layer 4 (20 μm): 100% Admer NF 498E
Layer 5 (65 μm): 100% LDPE

Comparative Example 2

Colorless Film Containing at Least One Compound Absorbing and/or Reflecting UV Radiation Layer 1 (65 μm): 100% LDPE
Layer 2 (20 μm): 97% Admer NF 498E and 3% Batch 1
Layer 3 (30 μm): 100% PA
Layer 4 (20 μm): 97% Admer NF 498E and 3% Batch 1
Layer 5 (65 μm): 100% LDPE

Comparative Example 3

Yellow Film Containing at Least One Colored Pigment or Dye Absorbing and/or Reflecting Short-Wavelength Visible Light Layer 1 (65 μm): 97% LDPE and 3% Batch 2
Layer 2 (20 μm): 100% Admer NF 498E
Layer 3 (30 μm): 100% PA
Layer 4 (20 μm): 100% Admer NF 498E
Layer 5 (65 μm): 97% LDPE and 3% Batch 2

Comparative Example 4

The multilayer film of Comparative example 4 consists of 5 layers, has a layer thickness of 230 μm, is commercially available and represents an opaque silver to gray colored film. Layers 1-5 respectively adjoin one another directly in the following order. All subsequent % data represent wt %.

Layer 1 (95 μm): LDPE and silver color batch
Layer 2 (9 μm): 100% Admer NF 498E
Layer 3 (26 μm): 100% PA
Layer 4 (9 μm): 100% Admer NF 498E
Layer 5 (93 μm): LDPE and silver color batch Example 1

Yellow Film Containing at Least One Colored Pigment or Dye Absorbing and/or Reflecting Short-Wavelength Visible Light and at Least One Compound Absorbing and/or Reflecting UV Radiation Layer 1 (65 μm): 97% LDPE and 3% Batch 2
Layer 2 (20 μm): 97% Admer NF 498E and 3% Batch 1
Layer 3 (30 μm): 100% PA
Layer 4 (20 μm): 97% 100% Admer NF 498E and 3% Batch 1
Layer 5 (65 μm): 97% LDPE and 3% Batch 2

Example 2

Yellow Film Containing at Least One Colored Pigment or Dye Absorbing and/or Reflecting Short-Wavelength Visible Light and at Least One Compound Absorbing and/or Reflecting UV Radiation The multilayer film of Example 2 consists of 9 layers, has a layer thickness of 170 μm and was produced by blown film coextrusion and by tube adhesive bonding. Layers 1-9 respectively adjoin one another directly in the following order. All subsequent % data represent wt %.

Layer 1 (29 μm): 97.5% LDPE and 2.5% Batch 2
Layer 2 (6 μm): 100% Admer NF 498E
Layer 3 (30 μm): 100% PA
Layer 4 (6 μm): 100% Admer NF 498E
Layer 5 (58 μm): 87.5% ethylene-vinyl acetate copolymer, 2.5% Batch 2, 10% Batch 1
Layer 6 (6 μm): 100% Admer NF 498E
Layer 7 (30 μm): 100% PA
Layer 8 (6 μm): 100% Admer NF 498E
Layer 9 (29 μm): 97.5% LDPE and 2.5% Batch 2

Example 3 A colorless transparent multilayer film according to the data below was produced with a total layer thickness of 200 μm by blown film coextrusion. The layers indicated respectively adjoin one another directly in the following order. All subsequent % data represent wt %.

Example 3

Colorless Transparent Film

Layer 1 (65 μm): mixture of 50 wt % polypropylene (Dow R 338-02N) and 50 wt % LDPE
Layer 2 (15 μm): 100% Admer QP 520 E
Layer 3 (40 μm): Durethan C 38 F (copolyamide)
Layer 4 (15 μm): Admer NF 498 E (adhesion promoter)
Layer 5 (65 μm): mixture of LDPE/LLDPE 70:30

Comparative Example 5

Colorless/Transparent Film

This multilayer film having the layer sequence indicated below and a total layer thickness of 200 μm was produced by blown film coextrusion.

Layer 1 (145 μm): LDPE
Layer 2 (15 μm): Admer QB 520 E (adhesion promoter)
Layer 3 (40 μm): Durethan C 38 F (copolyamide)

Determination Methods:

Determination of the Contact Transparency:

In order to determine the contact transparency, the respective film is placed on a white DINA4 page printed with black text (font: Arial, font size 10) and the legibility of the text lying underneath is assessed using a scoring system:

Mark 1: very easy to read (text clearly discernible, not obvious that there is a film on top of the text), Mark 2: very minor interference with the legibility of the text under the film, Mark 3: minor interference with the legibility of the text under the film, Mark 4: significant interference with the legibility of the text under the film. The text can, however, still be read overall.

Mark 5: major interference with the legibility of the text under the film. The letters appear very blurred and obscured, and are virtually no longer discernible. The text can virtually no longer be read.

Mark 6: the text under the film is no longer discernible and cannot be read. The film obscures the text (almost) completely. There is no longer any contact transparency.

The contact transparency depends on the layer thickness of the respective films. In Examples 1 and 2 and Comparative Examples 1-3, the layer thickness of the film is less than or equal to 200 μm. In Comparative Example 4, the layer thickness of the film is 230 μm. A similar result would, however, also be obtained in Comparative Example 4 with a layer thickness of less than 200 μm for this film, since it is opaque.

Determination of the UV/Light Blocking Effect:

UV-VIS instrument used: UV-3101PC from Shimadzu.

In order to determine the protective effect of the film against UV radiation or short-wavelength visible light, a small bag (size 10 cm×10 cm) was made from the film by sealing. In this bag—in a darkened room—about 50 g of a reactive resin mixture which can be cured by UV or short-wavelength visible light is placed within 1 minute. The bag is then fully closed hermetically, and exposed to sunlight (the tests were carried out on sunny days with more than 8 hours of insolation per day in July).

The time until the packaged resin had solidified by radiation-induced curing by sunlight is determined. With a maximal protective effect against UV radiation or short-wavelength visible light, the resin can be exposed to sunlight for an indefinite length of time without curing.

Measurement Results:

| Example | Transmission [%] at wavelengths 300/350/380/400/430 and 450 nm | Contact transparency [Mark] | Curing time of the resin in the film due to sunlight |
|---|---|---|---|
| Comp. Example 1 | 90.3/91.2/92.2/92.7/93.7/95.6 | 1 | Less than 1 min |
| Comp. Example 2 | 1.02/0.12/0.58/33.6/84.9/91.03 | 1 | 30 min |
| Comp. Example 3 | 12.31/20.63/3.25/2.25/1.32/0.92 | 2 | 14 min |
| Comp. Example 4 | 0.92/1.21/1.42/1.63/1.43/1.30 | 6 | 25 days |
| Example 1 | 0.22/0.33/0.043/0.037/0.032/0.066 | 2 | No curing after 3 months |
| Example 2 | 0.026/0.018/0.021/0.043/0.071/0.082 | 3 | No curing after 3 months |

Comparative Example 1 shows that a conventional colorless highly transparent film has no blocking effect at all against UV or short-wavelength visible light (Vis) so that immediate curing of the resin takes place under the effect of UV-Vis radiation. There is a transmission of more than 90% in the wavelength range of from 300 to 450 nm. Although the contact transparency of the film is excellent, the film does not however fulfill any protective function against radiation-induced resin curing, the resin being cured in the range of from 300 to 450 nm.

Comparative Example 2 shows that a certain protective function in relation to Comparative Example 1 against curing of the resin by UV radiation (up to 380 nm) can be achieved by the addition of at least one compound absorbing and/or reflecting UV radiation, since the transmission of the film lies below 1.1% up to 380 nm. Nevertheless, curing of the resin by short-wavelength visible light with wavelengths of more than 380 nm still takes place, which is due to the increasing transmission at longer wavelengths.

The protective function of the film against radiation-induced resin curing is therefore still insufficient. The contact transparency of the film is still excellent.

Comparative Example 3 demonstrates that a certain protective function in relation to Comparative Example 1 against curing of the resin by visible light (beyond about 400 nm) can be achieved by the addition of at least one yellow colored pigment absorbing and/or reflecting short-wavelength visible light, since the transmission lies below 3% from 400 nm to 450 nm. Nevertheless, curing of the resin by UV light with wavelengths of less than 380 nm still takes place because the transmission here is much too high. The protective function of the film against radiation-induced resin curing is therefore still insufficient. The contact transparency of the film has been reduced somewhat in relation to Comparative Example 1 owing to the addition of a color batch; the contact transparency is, however, still excellent.

Comparative Example 4 shows a film which no longer has contact transparency. The transparency of this film is less than 1%, and the degree of haze is more than 99%. In this case, a silver to gray pigment was added in a high concentration to the film in order to achieve a protective effect against UV-Vis radiation, so that the resin does not cure in the critical wavelength range of from 300 to 450 nm. The film has a significantly increased protective effect against UV-Vis radiation in relation to the previous exemplary embodiments. Nevertheless, resin hardening could still be found after the packaged resin had been exposed to sunlight for 25 days. Owing to the insufficient or nonexistent contact transparency, however, the film of Comparative Example 4 can be used only to a very limited extent.

If, for example, glass fiber fabric impregnated with resin is wound with the film, then it is no longer possible to check whether the impregnation of the glass fiber material with resin has taken place fully and homogeneously.

Examples 1 and 2 demonstrate the suitability of the films according to the invention as a protective film to avoid the curing of radiation-curing resins in the range of from 300 to 450 nm.

Only by combining at least one compound absorbing and/or reflecting UV radiation and at least one colored pigment absorbing and/or reflecting short-wavelength visible light can the transmission be reduced so that virtually no resin curing takes place after storage in the sun for 3 months. The values for the transmission are always less than 0.5% in the range of from 300 to 450 nm. The contact transparency of the films according to the invention, which is still outstanding, should be emphasized in particular.

Suitability Test as an Internal Tubular Film

In order to establish the extent to which a transparent multilayer film according to Example 3 or Comparative Example 5 may be envisaged as an internally lying tubular film for the tube restoration system according to the invention, carrier material to be cured was applied on a support and respectively covered with a multilayer film according to Example 3 or a multilayer film according to Comparative Example 5. To this end, the multilayer film according to Example 3 or Comparative Example 5 was brought in contact by the layer of PP/PE mixture or polyamide with the carrier material to be cured, and subsequently cured with UV light.

The tubular film according to Example 3 could be removed again without difficulty after curing of the resin/carrier material and exhibited no mechanical damage. The multilayer film, however, was permanently bonded to the carrier material at some positions so that tearing of the film took place at such positions.

This risk of too intensive a bond of the polyamide layer of the multilayer film according to Comparative Example 5 with the cured resin also entails embrittlement and therefore mechanical damage to the internally lying tubular film and difficult removal of the tubular film after curing. Neither form of damage arises with the internally lying multilayer film in tubular form in a sewer restoration system according to the invention.

The invention claimed is:

1. A sewer pipe restoration system suitable for a tube lining technique, comprising a double-walled tube consisting of an external protective film in tubular form, an internal multilayer plastic tubular film, and an impregnated carrier material that is present between the two tubular films, wherein said external protective film comprises at least one layer based on at least one optionally modified thermoplastic olefin homo- or copolymer, said polymer comprising a combination of at least one organic or inorganic colored pigment or dye absorbing and/or reflecting short-wavelength visible light, and of at least one organic or inorganic compound absorbing and/or reflecting the UV radiation, wherein the impregnated carrier material can be cured by UV radiation.

2. A sewer pipe restoration system according to claim 1, wherein the internal multilayer tubular film comprises a layer a) of at least one polyolefin, at least one olefin copolymer or of a mixture of polyolefins, which comes in direct contact with the carrier material, an adhesion promoter layer b), a barrier layer c) based on polyamide, a further adhesion promoter layer d) and a layer c) based on at least one olefin homo- or copolymer.

3. A sewer pipe restoration system according to claim 1 wherein the impregnated carrier material is a glass fiber material impregnated with and unsaturated resin system.

* * * * *